No. 753,541. PATENTED MAR. 1, 1904.
W. A. BUTLER.
WINDMILL.
APPLICATION FILED SEPT. 19, 1903.
NO MODEL.
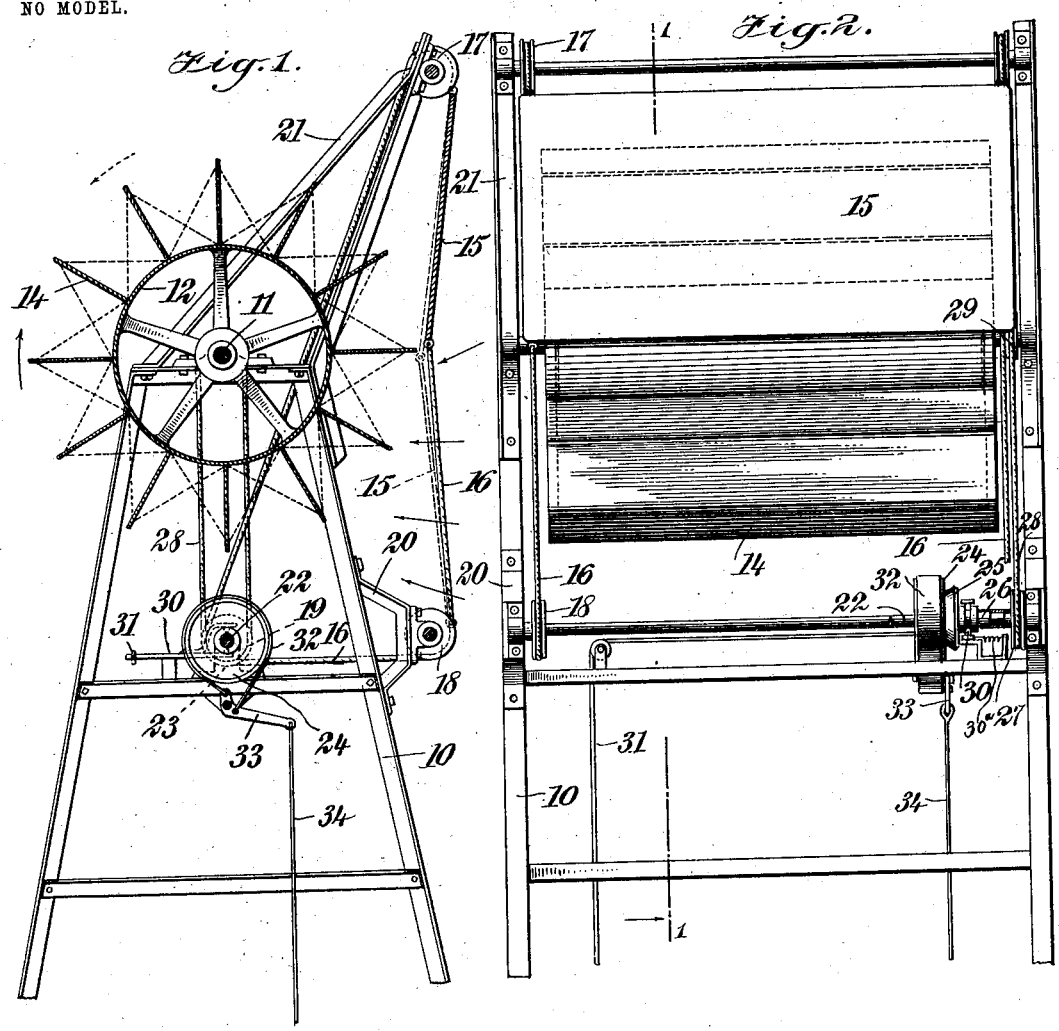
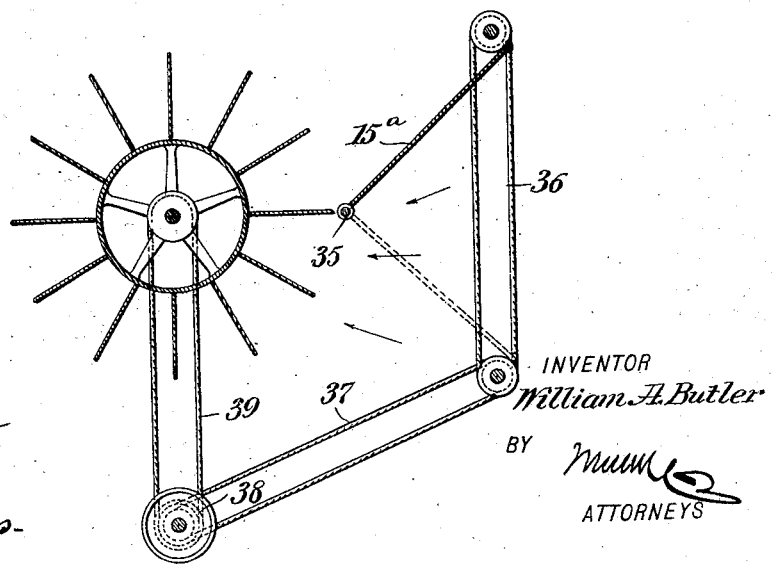
WITNESSES:
INVENTOR
William A. Butler
BY
ATTORNEYS No. 753,541. Patented March 1, 1904.

UNITED STATES PATENT OFFICE.

WILLIAM A. BUTLER, OF SAN FRANCISCO, CALIFORNIA.

WINDMILL.

SPECIFICATION forming part of Letters Patent No. 753,541, dated March 1, 1904.

Application filed September 19, 1903. Serial No. 173,847. (No model.)

*To all whom it may concern:*

Be it known that I, WILLIAM A. BUTLER, a citizen of the United States, and a resident of San Francisco, in the county of San Francisco and State of California, have invented a new and Improved Windmill, of which the following is a full, clear, and exact description.

This invention relates to a means for reversing the movement of wind-wheels of that class in which the wheel is provided with radial blades placed flat against the wind and the wheel being mounted on an axis extending across the line of movement of the wind.

Broadly speaking, my invention comprises a shield which is mounted to move so that either the upper or lower half of the wind-wheel may be covered, as desired, and by thus causing the wind to strike the wheel at opposite sides of its axis the movement of the wheel may be reversed, as will be understood.

This specification is an exact description of two forms of my invention, while the claims define the actual scope thereof.

Reference is to be had to the accompanying drawings, forming a part of this specification, in which similar characters of reference indicate corresponding parts in all the views.

Figure 1 is a section on the line 1 1 of Fig. 2. Fig. 2 is a front elevation of the invention, and Fig. 3 is a diagrammatic view of a modified form of the invention.

Referring to Figs. 1 and 2, 10 indicates any suitable framing or tower for supporting the wind-wheel, which comprises the horizontal axle 11, extending transversely to the air-current, a suitably-constructed hub 12, and blades 14, extending radially of the axle, so as to be presented sidewise or transversely to the horizontal air-currents. 15 indicates a shield, which is of rectangular form, as best shown in Fig. 2, and has ropes 16 connected to each end. Said ropes pass over guide-sheaves 17, 18, and 19, and by drawing on these ropes the shield may be moved from the position shown in full lines in Fig. 1 to that shown by dotted lines in said view, and thus the wheel may be caused to be driven in either direction, according to the position of the shield. The pulleys 18 are carried on brackets 20, projecting forwardly from the frame 10. The pulleys 17 are carried on arms or brackets 21, extending upward and outward from the frame or tower 10, and the pulleys 19 are mounted on a shaft 22, which is suitably mounted in bearings 23, carried in the tower 10. On said shaft 22 is a clutch member 24, coacting with a corresponding member 25. Said member 25 is carried by a sleeve 26, which is loose on the shaft 22 and driven by a pulley 27 and rope or belt 28, which latter passes from a corresponding pulley 29 on the axle of the wind-wheel. 30 indicates a fork by which the clutch member 25 may be shifted, and 31 indicates a rope or any other means extending down to the base of the tower whereby to operate the clutch. A spring $30^a$ or any other desired means may be employed to keep the clutch normally open, and its members may be engaged by drawing on the rope 31, as will be understood. 32 indicates a brake-strap applied to the clutch member 24, and 33 indicates a lever connected with a rope 34, by which the brake-strap 32 may be operated at will. The shield 15 will fall to its lower position by gravity, and it may be raised to its upper position by throwing in the clutch member 25, whereupon the shaft 22 will be driven from the wind-wheel, and by means of the pulleys 17, 18, and 19 the ropes 16 will be operated to raise the shield. The instant the shield reaches the upward position the clutch should be disconnected and the brake applied, thus holding the shaft 22 against rotation.

Fig. 3 indicates a modification in the arrangement of the shield. In this instance the shield $15^a$ is pivoted at a point 35, which lies in the horizontal plane of the axis of the wind-wheel, and by swinging the shield as indicated in Fig. 3 the same result is attained as is attained by the construction shown in Figs. 1 and 2. 36, 37, 38, and 39 indicate any suitable devices for so shifting the shield $15^a$. The devices may be and preferably are driven from the wind-wheel, the same as described with respect to Figs. 1 and 2.

Various changes in the form, proportions, and minor details of my invention may be resorted to at will without departing from the spirit and scope thereof. Hence I consider myself entitled to all such variations as may lie within the scope of my claims.

Having thus described my invention, I claim as new and desire to secure by Letters Patent—

1. The combination with a wind-wheel, of a shield for the purpose specified, a shaft, connections between the shaft and shield to operate the shield, a clutch, connections between one member of the clutch and the wind-wheel, and a brake for the shaft.

2. The combination with a wind-wheel, of a shield for the purpose specified, a rope connection with the shield, a pulley for operating the rope, a shaft on which the pulley is mounted, a clutch member fastened to the shaft, a second clutch member coacting with the first clutch member, means for driving the second clutch from the wind-wheel, means for shifting the second clutch member, and a brake to arrest the movement of the said pulley.

3. The combination of a wind-wheel turning on a horizontal axis and having blades disposed transverse to the movement of the air, a vertically-movable shield, and means for mounting and adjusting the shield to occupy a position either above or below the axis of the wind-wheel, for the purpose specified, said means having connection with the wind-wheel, whereby the wind-wheel furnishes the power for raising the shield.

4. The combination of a wind-wheel having a horizontal axis and blades disposed transverse to the movement of the air, a vertically-movable shield, means for mounting and moving the shield, said means having connection with the wind-wheel, to be operated by the power thereof, a clutch controlling said means, and manually-operative devices for actuating the clutch.

5. The combination of a wind-wheel having its axis disposed transversely to the movement of the air, a shield movable from one side to the other of said axis, for the purpose specified, and means for mounting and adjusting the shield, said means having connection with the wind-wheel, whereby the wind-wheel furnishes the power for moving the shield.

In testimony whereof I have signed my name to this specification in the presence of two subscribing witnesses.

WILLIAM A. BUTLER.

Witnesses:
FRANK I. BUTLER,
MARY E. RANDALL.